United States Patent [19]
Minakata

[11] Patent Number: 5,568,565
[45] Date of Patent: Oct. 22, 1996

[54] HANDWRITING INPUT METHOD AND APPARATUS

[75] Inventor: Hiroshi Minakata, Tokyo, Japan

[73] Assignee: International Business Machines Corporation, Armonk, N.Y.

[21] Appl. No.: 55,436

[22] Filed: Apr. 29, 1993

[30] Foreign Application Priority Data

Mar. 5, 1992 [JP] Japan .................................. 4-048287

[51] Int. Cl.$^6$ ................................ G06K 9/00; G06K 9/46
[52] U.S. Cl. ........................ 382/187; 382/120; 382/199; 382/202; 382/154
[58] Field of Search ................................. 382/9, 13, 21, 382/24, 25, 59, 119, 120, 123, 186, 187, 189, 199, 202, 220, 203, 154

[56] References Cited

U.S. PATENT DOCUMENTS

| | | | |
|---|---|---|---|
| 4,653,107 | 3/1987 | Shojima et al. | 382/13 |
| 4,718,103 | 1/1988 | Shojima et al. | 382/21 |
| 4,731,858 | 3/1988 | Grasmueller et al. | 382/21 |
| 4,878,249 | 10/1989 | Mifune et al. | 382/13 |
| 5,040,222 | 8/1991 | Muroya | 382/13 |
| 5,121,442 | 6/1992 | Togawa . | |

*Primary Examiner*—Jose L. Couso
*Assistant Examiner*—Matthew C. Bella
*Attorney, Agent, or Firm*—Gunn & Associates, PC

[57] ABSTRACT

A handwriting input method and apparatus is disclosed which generates a single line segment from a group of input line segments which are input by a user. The input line segments may be overlapping or disconnected short line segments, thereby allowing the user to enter lines in a free stroke format, much the way an artist sketches. For each of the input line segments a plurality of variable parameters are detected from the stroke data. The parameters for each input line segment are converted to a three-dimensional weighting function. The weighting functions for different line segments are combined, the edge of the resulting combined function is detected, and that edge is displayed as a line segment on a display device.

8 Claims, 11 Drawing Sheets

HANDWRITING INPUT METHOD AND APPARATUS

BACKGROUND OF THE INVENTION

1. Field of the Invention

This invention relates to a method and apparatus for inputting graphics by hand, using a two-dimensional input device such as a tablet, and displaying the results of said input.

2. Background Information

Graphical systems which use a pen as an interface to input handwritten characters have become increasingly important as the cost of liquid crystal displays decreases and their resolution increases.

Conventional systems which support handwritten input can be generally classified as either batch processing systems or interactive processing systems. In batch processing systems, preprocessing is applied to drawings written on paper to recognize topology of line segments. Examples of these systems are those which deal with flowcharts and wiring diagrams. In contrast, the interactive processing systems recognize figures. However, in these interactive systems, the line drawings which can be input are limited to line segments whose size allows them to be segmented or "cut out." That is, input is performed by writing (with one stroke) a primitive unit. Recognition is performed by matching the input unit with a basic figure such as a square, circle or character. Examples of the methods used in the interactive systems are described in Kojima,et al., "On-line Handwriting Figure Recognition by the Adjacent Segments Structural Analysis Method," Information Articles Journal, August 1987 and in the Published Unexamined Japanese Patent Application No. 226387/1990.

In actual practice, however, when a user desires to input a free curve, it is difficult for that user to input the entire desired curve at one time. It is more natural to create a curve by drawing short line segments, repeating the process by trial and error until the entire curve is completed—much in the same way that a designer sketches. As a result, a graphic input method for drawing a free curve which can connect short, sketched line segments (such as result from drawing the curve on paper) is desirable.

As costs are reduced and resolution increased for liquid crystal display tablets, new applications which use interactive sketch-like graphical input systems that employ pen input will be developed. In such applications, an input method as described above—that is input of short line segments for drawing in a sketch style—will be important.

In the prior art, methods of generating a curve consisting of short line segments using parabolic blending techniques was known. One such method is described in A. W. Overhauser, "Analytic Definition of Curves and Surfaces by Parabolic Blending," Technical Report No. SL 68-40, Ford Motor Company Scientific Laboratory, May 8 (1968). However, in Overhauser's method, the number of objective points is limited according to the degrees of parabolas to be blended, and only so-called short line segments can be treated. Accordingly, it would be difficult to use this method to create one continuous line segment from a plurality of input line segments of differing length—i.e., both long or short—as would be performed by a user actually drawing on paper).

In summary, many handwriting input systems have been proposed which place emphasis on recognition of a figure, drawing or character. These systems do not address an interface technique which would allow line segments to be input in the same way that a user create these segments by hand on paper, although this feature is essential for interactive systems.

OBJECTIVES OF THE INVENTION

It is therefore an object of this invention to provide a method and apparatus which provide an ability to input a graphic by hand by drawing that graphic, in a free, sketch-like manner, such as by creating a figure by repeatedly writing or overwriting long and short line segments, using a trial and error approach.

It is another object of this invention to provide a method and apparatus for automatically generating one appropriate line segment from a group of line segments input by hand, where these line segments are overlapping or disconnected and where the method and apparatus are independent of the length or discontinuity of the segments. Thus, the line actually intended by the user could be created from input consisting of multiplicity of strokes.

SUMMARY OF THE INVENTION

In accordance with this invention, data from multiple strokes input by a user is processed (or merged) using a plurality of variable parameters, (these parameters being dependent on the pen input states). The result of the processing is a single line segment. More precisely, stroke data (created by a user using a pen or like instrument) is projected onto a parameter space using weighting functions and spatially differentiated to extract the edge. This edge is determined to be the line segment inputted by the user. If several short line segments coexist, a newly input stroke and the neighboring previously input stroke are integrated and processed as one stroke. This allows the operation between overlapping or connecting line segments to automatically be processed. The result is an interface which can receive input and result in an output curve in a manner similar to that used by a user sketching a line on paper.

DETAILED DESCRIPTION OF THE INVENTION

Figure 1:
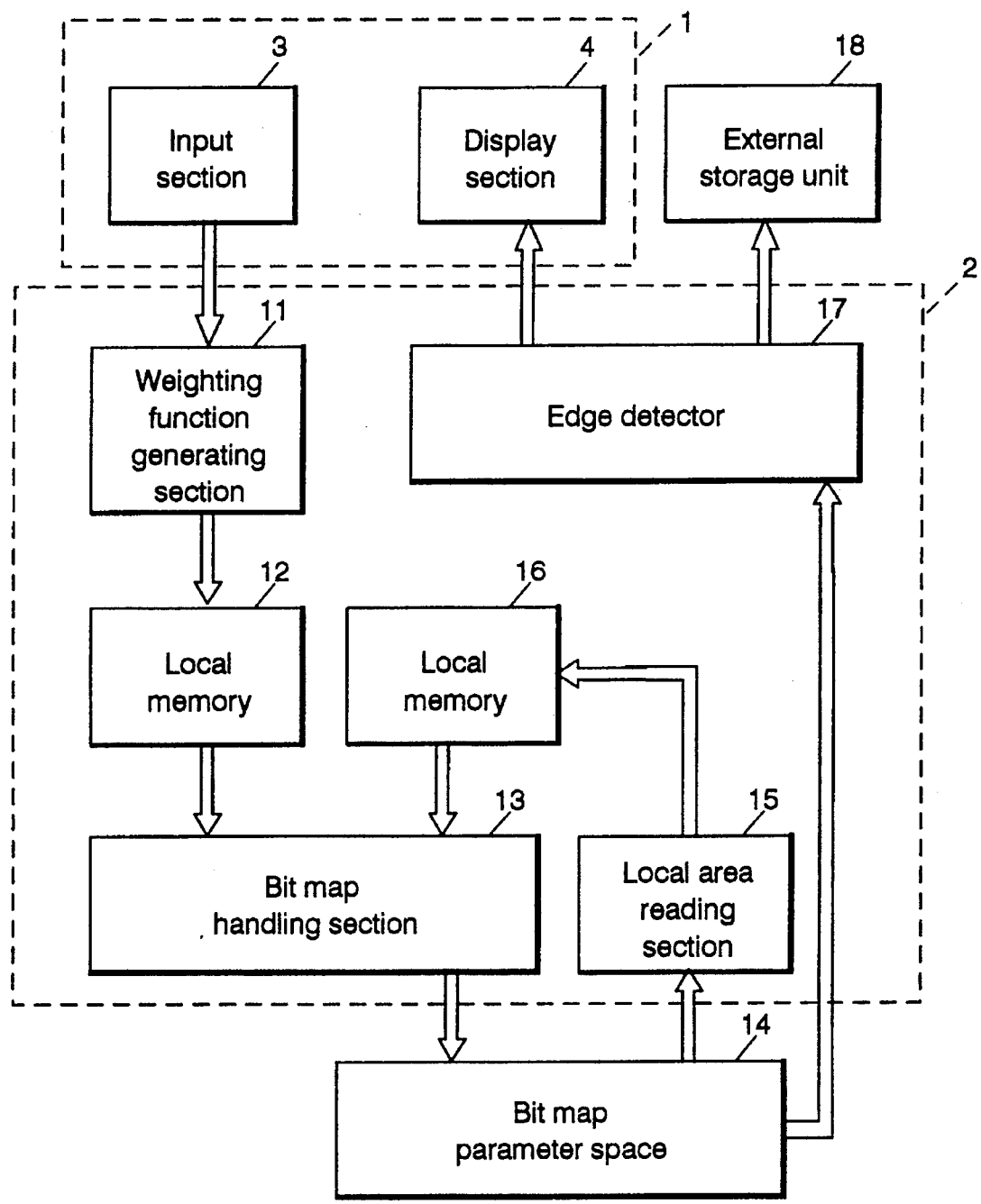
FIG. 1 is a block diagram showing one embodiment of the general configuration of the handwriting input apparatus.

FIG. 1 shows one embodiment of the input/output interface portion of the handwriting input apparatus of this invention, which includes integrated input/output device (1) and processing section (2). The Integrated input/output device (1) includes a tablet with a liquid crystal display, where the display has an input section (3) and an output section (4).

In this embodiment, the weighting function generating section (11) of processing section (2) places weights on the input data, creating a three-dimensional weighting function which may be expressed as bit map data. The result is held in local memory (12). The Bit map handling section (13) performs arithmetic processing on the bit map data, and stores the result in the bit map parameter space of the global memory area (14). All stroke data (that is, all the input from the entire input screen) is stored in global memory area (14).

Continuing to refer to FIG. 1, each time new stroke data is inputted (that is, the user draws a new line segment with the pen on the input/output interface), data is read out from global memory area (14) by local area reading section (15) and held in local memory (16). (Note that, in order to increase efficiency, only the stroke data in a local area in the vicinity of the newly input stroke need be read out.) An adding operation is performed in the bit map handling section (13) on the bit map data held in both local memories (12 and 16), and the result obtained from such addition is again stored in global memory (14). The edge detector (17) extracts the edge of three-dimensional bit map data and converts it to two-dimensional data, which is displayed on the display of the output section (4) as a line drawing. The displayed line drawing may be confirmed as correct by the user. The two-dimensional line drawing is also recorded in memory (18) and may be used in later processing.

Figure 2:
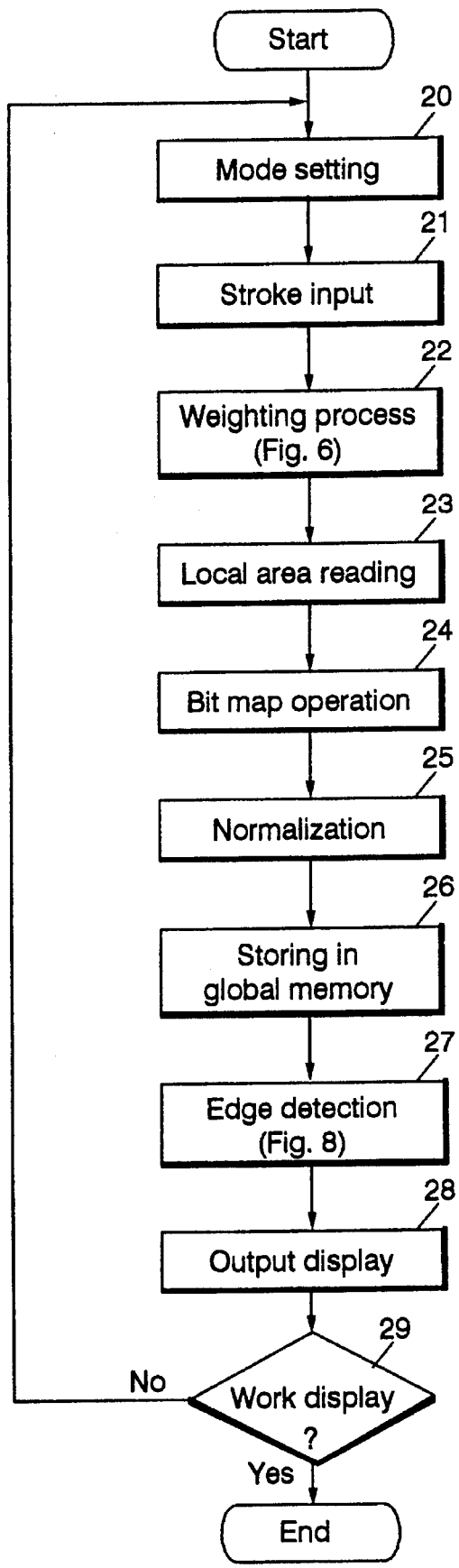
FIG. 2 is a flowchart of the processing performed by the handwriting input apparatus shown in FIG. 1.

FIG. 2 is a detailed flowchart of the processing performed by the handwriting input apparatus in FIG. 1. As shown in FIG. 2, the user first sets the mode that he will be using (ADD, ERASE, etc. ) and decides on the "roughness" to be used in evaluating his input (FIG. 2, step 20). The user then inputs stroke data by hand using a pen (FIG. 2, step 21). This data is assigned weights by the weighting function generating section and a three-dimensional weighting function is generated as bit map data (FIG. 2, step 22). For each new stroke input, the bit map data of the weighting functions for strokes previously input in the vicinity of the new stroke (if any such exist) is read out from the global memory area (FIG. 2, step 22) to local memory. In the bit map handling section, a bit map spatial operation is performed using both prior and new bit map data (FIG. 2, step 24). The result of the operation is normalized (FIG. 2, step 25) and stored (FIG. 2, step 26) in global memory area. The three-dimensional weighting function in the global memory area is mapped onto two-dimensional parameters by a technique such as edge detection (FIG. 2, step 27) and displayed (FIG. 2, step 28) as a line drawing on the output display. This process is repeated until there is no further input (FIG. 1, step 29).

Figure 3:
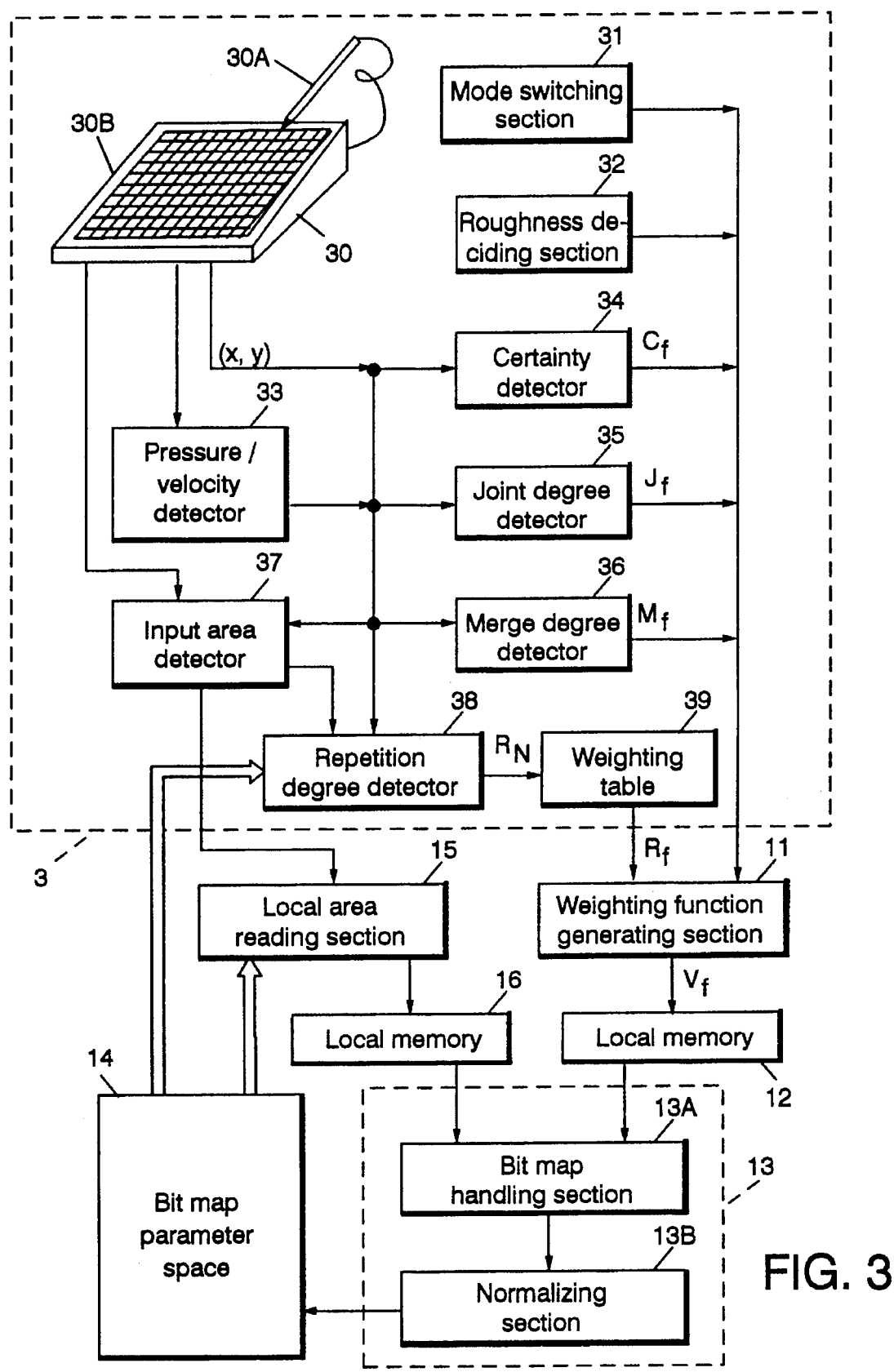
FIG. 3 is a detailed diagram of the stroke input section 3 of FIG. 1.

FIG. 3 shows additional details of the stroke input section (3) of FIG. 1. FIG. 3 shows a tablet with a liquid crystal display (30). The user places pen (30A) in contact with the liquid crystal display face (30B) of the tablet (30) and draws a line by hand. The user uses a means for switching modes (31) to specify the input mode of the line drawing. (Examples of possible modes are: an "ADD" mode for writing a line segment, a "REPLACE" mode for rewriting, and an "ERASE" mode for erasure.) The user also uses a means for deciding roughness (32) to specify the "roughness" of the figure that the user will be inputting. A pressure/velocity detector (33) detects the pen-stroke pressure P and input velocity V with which the user inputs (or draws) a line segment (stroke data) SL. (P(t) will be used to indicate Pen-stroke pressure at time t and V(t) will be used to indicate Pen velocity at time t.)

It will be noted that the Published Unexamined Patent Application No. JA 276 17/1988 official gazette discloses a tablet which can detect pen stroke pressure P. The input velocity V can be calculated by dividing the distance between two points (SLn-1, SLn) of a line segment by the required time to draw that segment.

In addition to the positional information (x, y), pen-stroke pressure P(t) and input velocity V(t), each line segment will have associated with it a certainty factor Cf, a joint factor Jf and a merge factor Mf. These factors are determined for the line segment by using certainty detector 34, joint degree detector 35 and merge degree detector 36, respectively.

The final factors associated with a line segment reflect the number of times N that the input of a line segment SL is "repeated." That is, using the number of times N of repetition or overwriting in a certain local area obtained by an input area detector 37 and a repetition degree detector 38, the number of times of repetition RP(N) of a certain point AN is obtained. RP(N) is used as input to weighting table 39, and thus converted to repetition factor Rf.

Thus, each line segment SL input by the user has associated with it a certainty factor Cf, joint factor Jf, merge factor Mf, repetition factor Rf, and position information (x, y). Continuing to refer to FIG. 3, weighting function generating section (11) performs a weighting processing (22) which uses this information, as well as the mode and roughness originally input by the user, to define a weighting function Vf.

The following is a detailed description of the weighting process.

Figure 4:
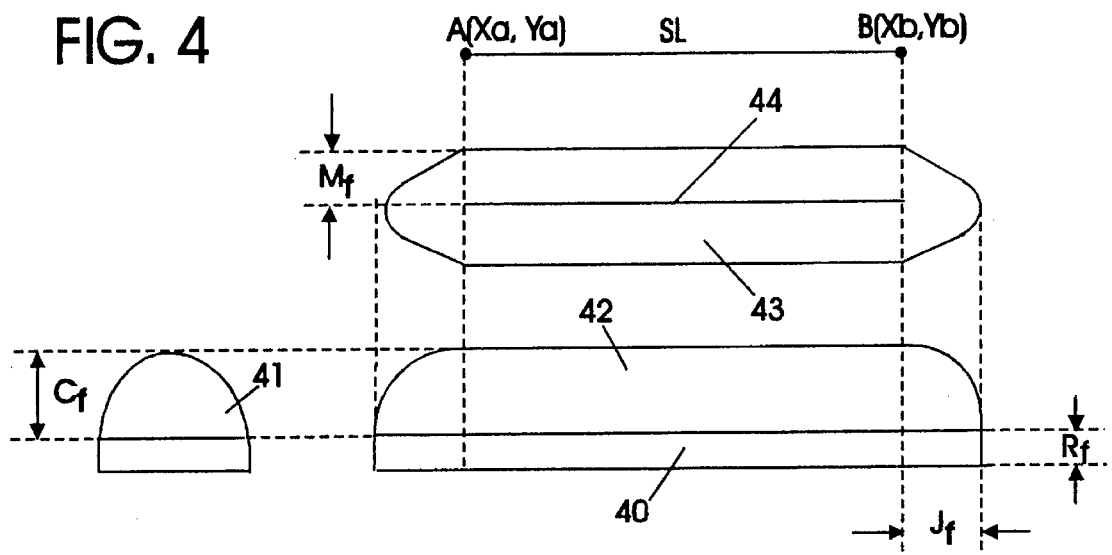
FIG. 4 is a representation of the weighting function Vf.

The weighting function Vf is a three-dimensional parameter which is generated from Certainty factor (Cf), Merge factor (Mf), Joint factor (Jf) and Repetition factor (Rf), as shown in FIG. 4. Mathematically, this is expressed by Vf=F(Cf, Mf, Jf, Rf) As can be seen from FIG. 4, the set of weighting functions Vf corresponding to the input line segment SL forms a three dimensional figure somewhat resembling a mountain (represented in three cross-sections 4t, 42, and 43) which has the line segment as a ridge (44).

Certainty factor Cf is a parameter which shows whether the user is writing a line segment with certainty. Cf depends on pen-stroke pressure P(t) and pen velocity V(t). Thus, $$Cf = kc \times P(t)/V(t)$$

(kc is a constant)

Instead of pen-stroke pressure, the certainty component may be detected from the power with which the pen is grasped by the user, the fluctuation of the stroke of the input line segment, or other, similar measures. Alternatively, the user may directly choose a value for Cf and input that value into the system.

Merge factor Mf is a parameter which shows the strength with which the user writes a line segment SL. Thus, Mf measures whether or not the user writes the line segment with emphasis. Mf depends on the stroke pressure P(t) of the pen.

$$Mf = km \times P(t)$$

(km is a constant)

Joint factor Jf is a parameter which depends on pen velocity V(t).

$$Jf = kj \times V(t)$$

(kj is a constant)

A quickly written line segment may be disconnected or have a thinner middle portion For quickly written segments, it is desirable to be able to "correct" the segments and create a single line by connecting a given segment with other line segments where those segments are related in that they all lie on a projected line extending in a certain direction. Conversely, it is preferred not to "correct by connecting" those line segments which are slowly drawn (as would be the case of input which reflect careful finished details). Thus, joint factor Jf is a parameter which reflects whether the user is creating a line segment roughly (with possible gaps or jumps) or densely. Jf may be set by the user when he inputs his drawing.

Repetition factor Rf is a parameter which shows whether the user intends to repeatedly write line segments. Rf depends on 1) the number of repetitions N of line segments input in a given area and 2) whether or not a line segment had previously been input in the vicinity in which these repeated line segments are input.

The repetition factor Rf affects the weighting function Vf only if the user is inputting line segments in the "ADD" mode. Rf does not affect the weighting function Vf in the "REPLACE" mode.

$$Rf = kr \times R(N)$$

(kr is a constant)

Rf is obtained from by using a weighting table (Refer to FIG. 3, weighting table 39). For example, if the number of repetitions in a local area is N, Table 1 shows a possible weighting table that expresses the relationship between N and Rf.

factor Jf and merge factor Mf of the input line segment SL. Alternatively, it may be calculated from the areas of a set of units into which liquid crystal display face 30B (or global memory area) is previously subdivided, or as an area within a fixed distance from each point of the input stroke for each input.

The following is a description of the bit map parameter spaces of global memory area (FIG. 1, bit map parameter space 14) which is used to hold the data of weighting function Vf area. The bit map parameter spaces X, Y correspond to two-dimensional coordinates (x, y) on input screen 30B. The value projected to the neighboring parameter space when a certain section on the input screen is point A(Xa, Ya), point B(Xb, Yb) is a function value expressed by $$Vf(x, y) = K(Xa, Ya, Xb, Yb, Cf, Mf, Jf, Rf).$$

Figure 5:
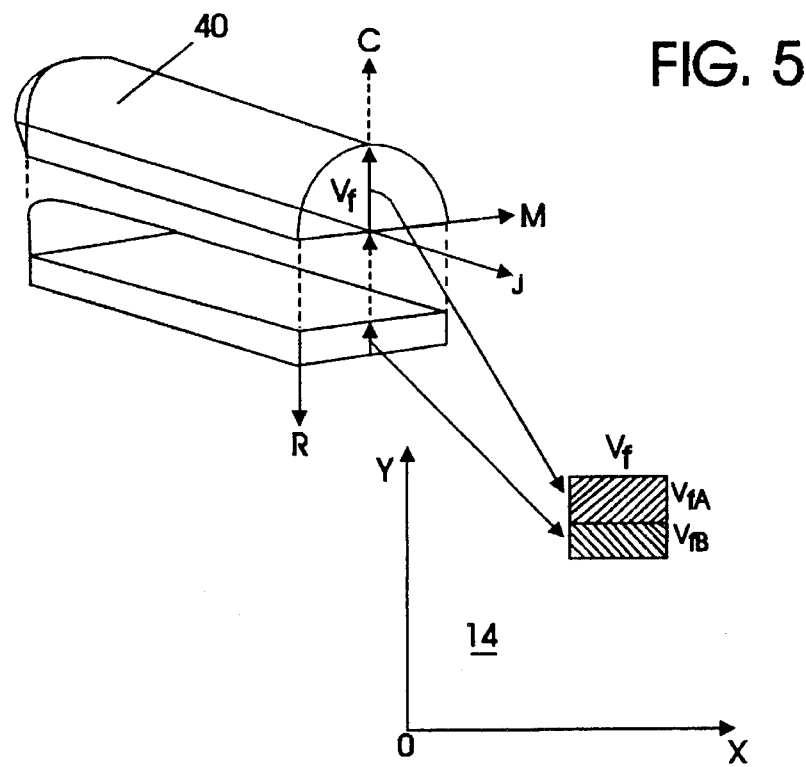
FIG. 5 is a detailed representation of the global memory of FIG. 3.

As shown in FIG. 5, weighting function data Vf is recorded in the parameter space, separately in the VfA area and VfB area.

$$Vf = VfA \times VfB$$

That is, the weighting function VfA corresponding to certainty factor Cf, merge factor Mf and joint factor Jf of each point and the weighting function VfB corresponding to repetition factor Rf are held in two areas in the bit map parameter space, respectively.

If weighting function data Vf is assumed to occupy an 8-bit parameter plane for one point, 5-bit and 3-bit planes can be assigned to VfA and VfB, respectively. Accordingly, it is possible to record the 8-tone values in Table 1 as repetition factor Rf. (Refer to FIG. 5 for a pictorial representation of this method of recording Vf.) For instance, if eight bits are assigned to one point in a 640×480 VGA screen, the parameter space of global memory area 14 can be implemented by a memory of about 300 KBytes.

Figure 6:
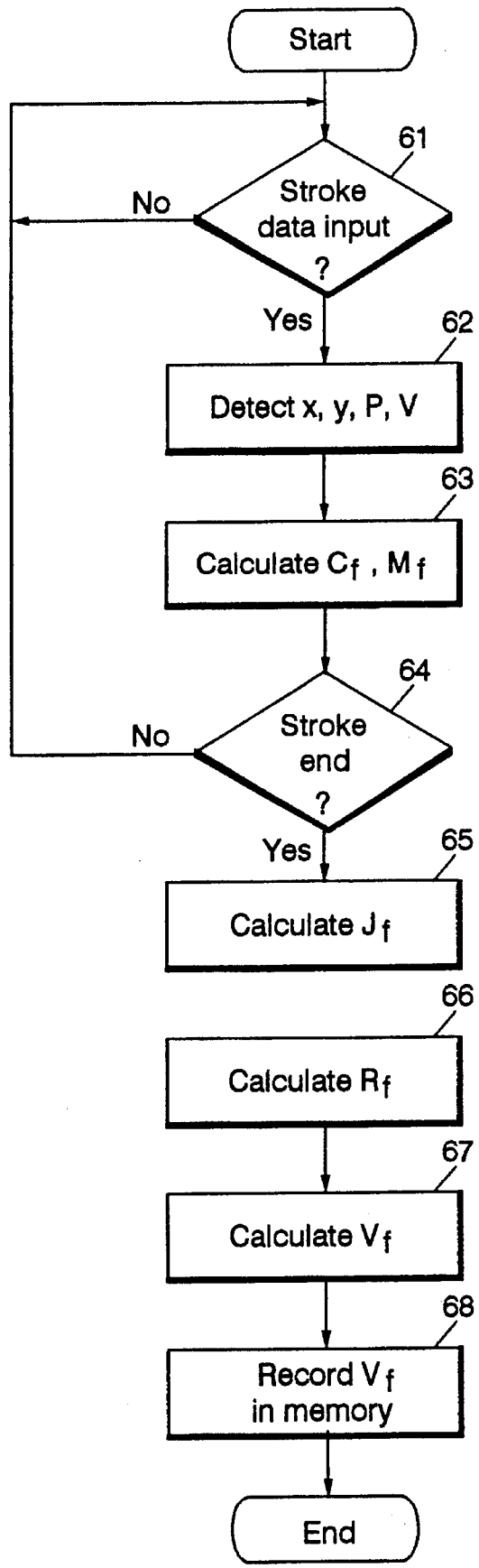
FIG. 6 is a flowchart of the weighting process found of FIG. 2.

FIG. 6 shows the flow of the weighting process. In this example, the input mode for writing line segments is assumed to be the "ADD" mode for writing line segments. First, the input line segment SL is input (step 61). The input segment SL or stroke data, the pen-stroke pressure P(t), the pen velocity V(t), and the position information (x, y coordinates) are detected at each input point AN of the line segment (step 62). Certainty factor Cf and merge factor Mf

TABLE 1

| N     | 0 | 1   | 2 | 3   | 4   | 5   | 6   | 7   | 8   | 9   | - - - |
|-------|---|-----|---|-----|-----|-----|-----|-----|-----|-----|-------|
| Rf    | 1 | 3/2 | 1 | 2/3 | 1/2 | 1/3 | 1/4 | 1/8 | 1/8 | 1/8 | - - - |
| RP(N) | 0 | 1   | 2 | 3   | 4   | 5   | 6   | 7   | 7   | 7   | - - - |

In the example in Table 1, Rf becomes maximum for N=1 and decreases thereafter. That is, the effect of a newly input line segment decreases as the number of repetitions N increases. By this characteristic, it is possible to gradually correct an input line segment by overwriting. By previously defining RP(N) converted to integer values as in Table 1 instead of actual Rf, it is possible to simply record or read them out. Since, in this example, RP(N) takes a value of 0 to 7 according to the number of repetitions N, it can be recorded in a 3-bit plane. Clearly, by changing the values in the table, the user can change the effect associated with repetition of a line segment.

Repetition factor Rf uniformly affects the whole "local area" for each stroke input. The "local area" corresponds to the bottom surface of mountain 40 shown in FIG. 4. This area can be calculated from the position information, joint at input point AN are calculated as a function of the pen-stroke pressure P(t) and pen velocity V(t) (step 63). Subsequently, similar processing is repeated on each point between the starting point (point A) and the end point (point B) of the line segment SL. As the pen-stroke pressure or pen velocity at each point varies during the process of inputting of stroke data from point A to point B, certainty factor Cf and merge factor Mf change for each input point AN of line SL.

Once the input of a stroke is completed, joint factor Jf is calculated before and after both ends A and B of the line segment. The calculation is a function of the pen velocity V(t) (step 65).

Further, by use of the input area detector 37 and repetition degree detector 38, the repetition factor Rf (which depends on previous input in the same area (local area)) which is held in the bit map parameter space is read out. The number of times of repetition N is increased by one, and a new repetition factor Rf value is obtained from weighting table 39 (step 66).

Finally, weighting function Vf is calculated as a function of Cf, Mf, Jf and Rf obtained in each step described above (step 67), and the result is recorded in local memory area 12 of FIG. 1 (step 68).

Figure 7:
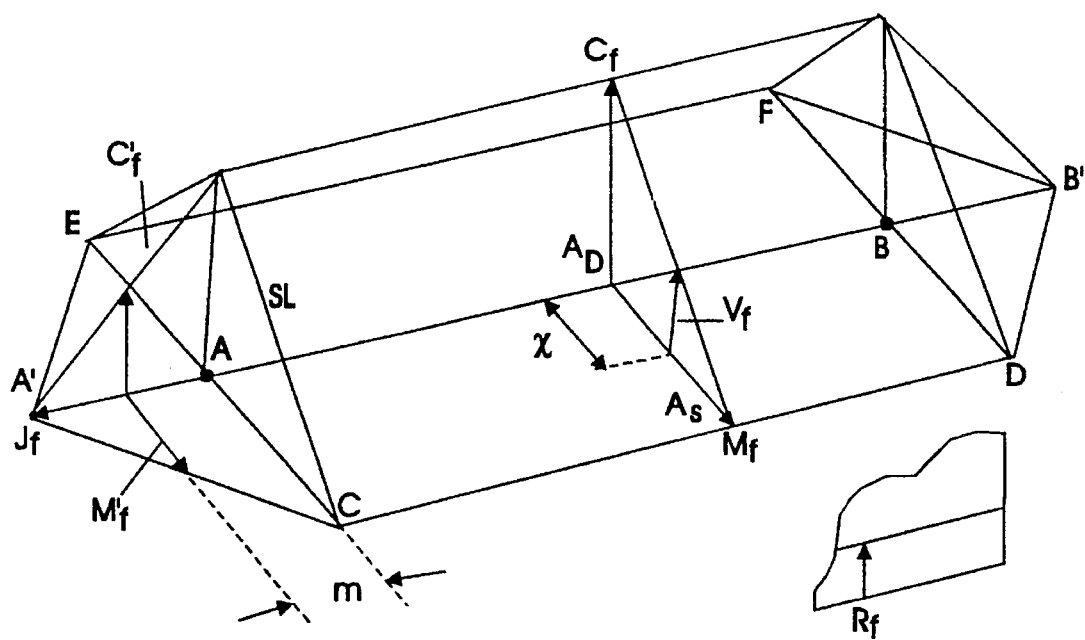
FIG. 7 is an example of the calculation used in the weighting function Vf.

FIG. 7 shows an example of the actual calculation of weighting function Vf. For the convenience of explanation, it is assumed that certainty factor Cf and repetition factor Rf are fixed between points A and B.

First, for the input segment SL having end points A and B, the weighting function Vf value is calculated as a function of certainty factor Cf, merge factor Mf, repetition factor Rf and distance 1 for each point within the rectangular area having a width of 2 Mf, namely, the area surrounded by points ACDBFE, as described below.

On the line segment AB, Vf=Rf×Cf. In addition, for point AS located as a position of distance 1 in the Mf direction from the line segment AB within the rectangular area, weighting function Vf is calculated as follows:

$$Vf = Rf \times (Mf - 1) \times Cf/Mf$$

The areas surrounded by triangles ACA'E and BDB'F before and after points A and B are subjected to a weighting process. That is, weighting function Vf in the triangular areas before and after points A and B is calculated as a function of certainty factor Cf, joint factor Jf, merge factor Mf and repetition factor Rf, as shown in the following equations.

First, for the area before point A, if the distance from point A in the Jf direction is assumed to be m, certainty factor Cf' on the AA' line is as follows.

$$Cf' = (Jr - m) \times Cf/Jf$$

Merge factor Mf' On the AA' line is as follows.

$$Mf' = (Jf - m) \times Mf/Jf$$

Accordingly, weighting function Vf of each point within the triangle ACA'E is as follows.

$$\begin{aligned} Vf &= Rf \times (Mf' - 1) \times Cf'/Mf' \\ &= Rf((Jf - m) \times Mf/Jf) - 1) \times Cf'/Mf \end{aligned}$$

Weighting function Vf of each point within the triangle BDB'F after point B can also be obtained in a similar manner.

A newly drawn line segment affects the surrounding parameter values. After the weighting process, in bit map handling section 13, a bit map space operation is performed between the new stroke data and already input stroke data (FIG. 2, step 24). That is, for each point AN of the newly input line segment SLN and the neighboring area, if there is bit data Vfn-1 for another already input line segment SLN-1, it is read into local area reading section 15 and an addition operation is performed with the bit data Vfn of the newly input line segment SLN in bit map handling section 13A. The added bit data is normalized in normalizing section 13B. Thus, for each stroke data input, the bit data Vfn of each point for the associated area is obtained and recorded (FIG. 2, step 26).

That is, depending on the degree of the Euclidean distance between the newly input stroke SLn and the existing stroke SLn-1, there is no effect on the existing bit map data if the distance is large, and the bit map data is corrected if the distance is small.

Edge Detection

Edge detection (FIG. 2, step 27) is now described.

Figure 8:
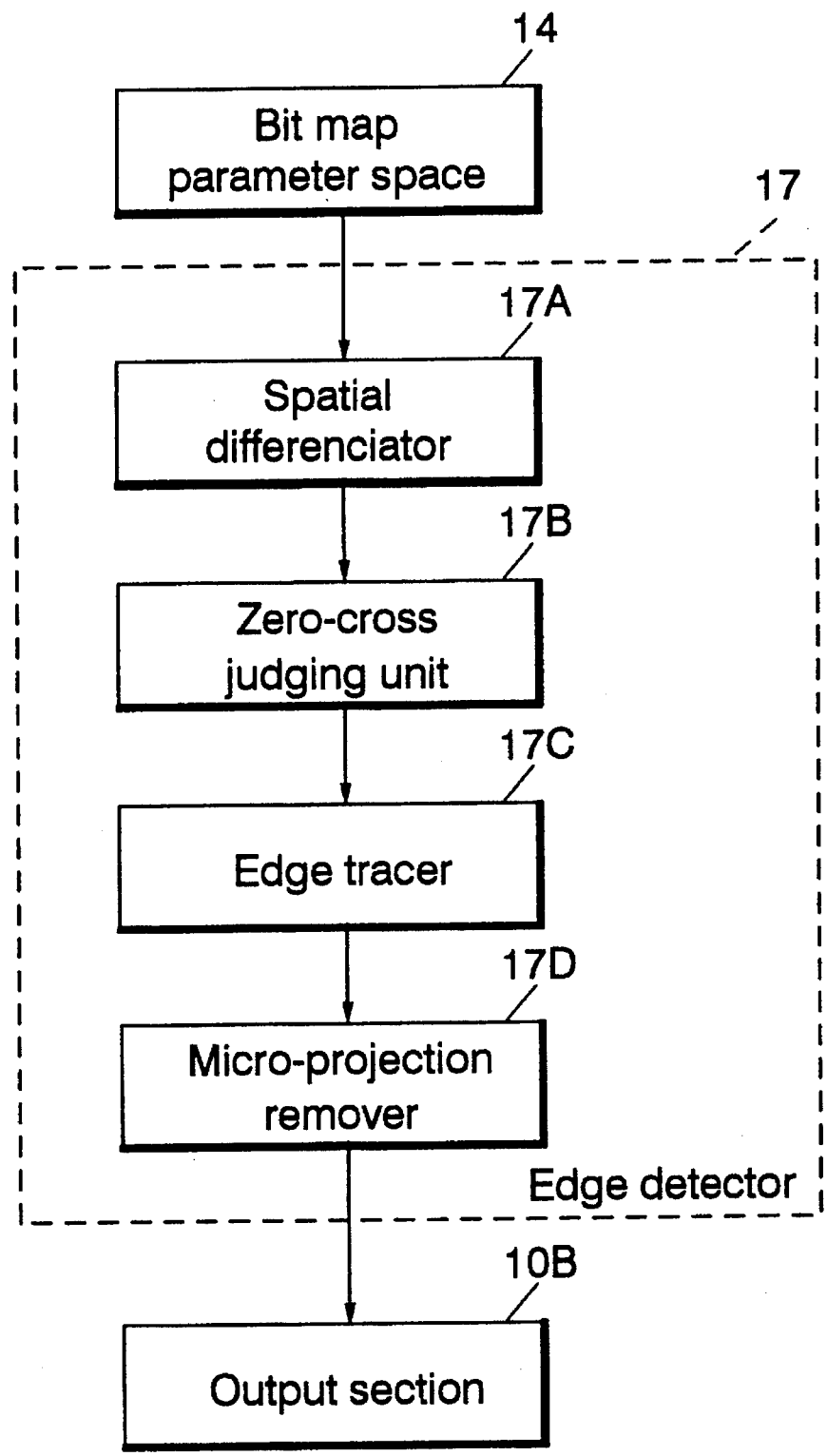
FIG. 8 is an example of the edge detector process.
Figure 9A:
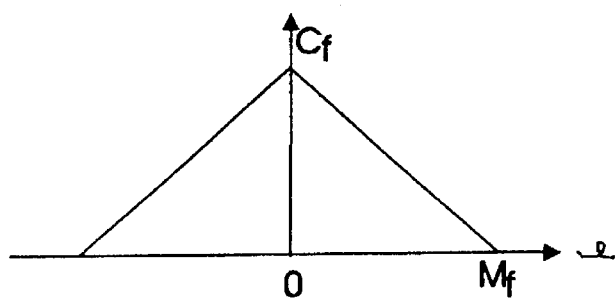
FIG. 9 is an illustration of the result of a change of the characteristics of the weighting function.
Figure 9B:
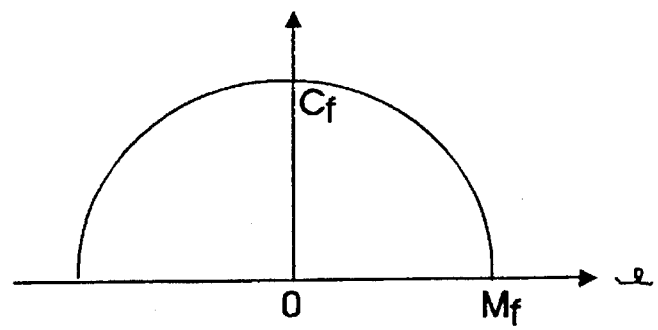
Figure 9C:
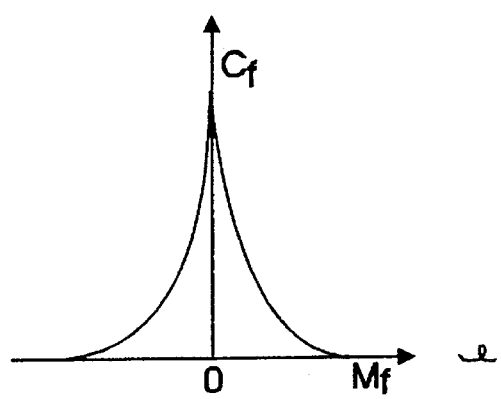
Figure 9D:
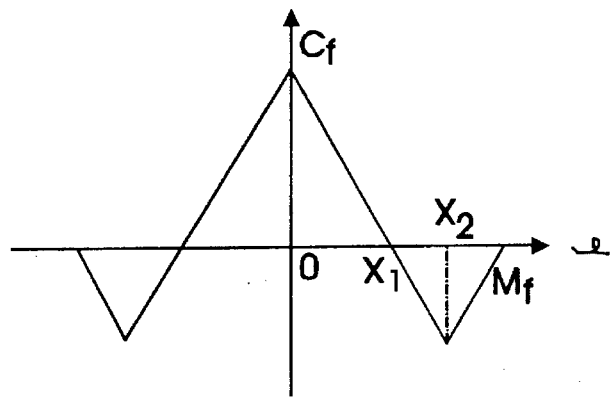
Figure 10A:
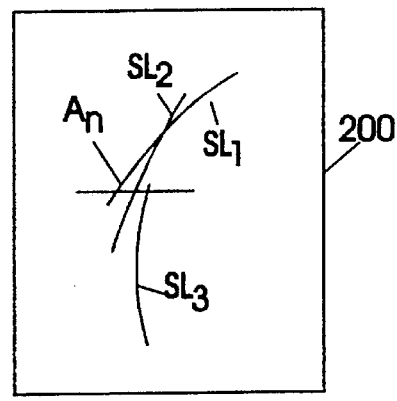
FIG. 10 is an example of automatically generating one curve from a sketch-like figure input.
Figure 10B:
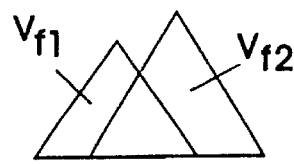
Figure 10C:
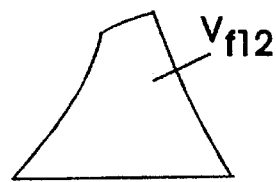
Figure 10D:
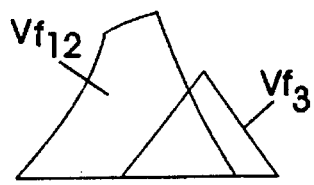
Figure 10E:
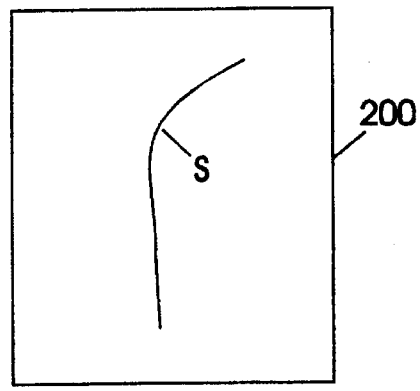
Figure 11A:
FIG. 11 is an example of the process used to make corrections by overwriting a line segment on part of a previously drawn line segment.
Figure 11B:
Figure 11C:
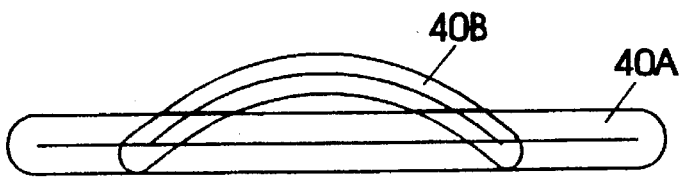
Figure 11D:
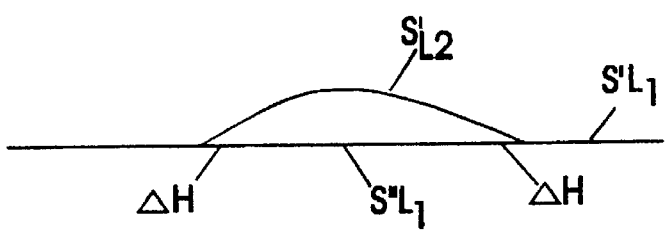
Figure 11E:
Figure 12A:
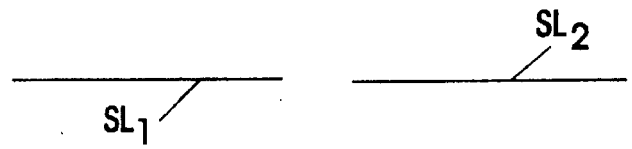
FIG. 12 is an example of automatically correcting a line segment which had become disconnected in the middle because of the speed of the user's drawing.
Figure 12B:
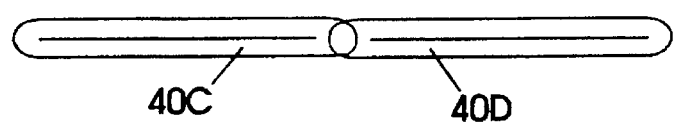
Figure 12C:
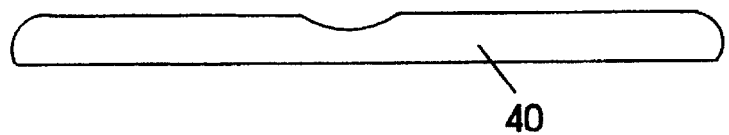
Figure 12D:
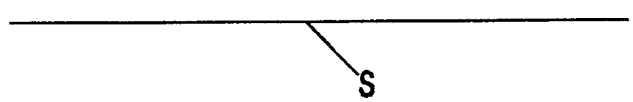

In the edge detector (FIG. 1, edge detector 17), the bit map data (a three-dimensional parameter) is converted to a two-dimensional parameter, that is, the edge is detected, and output and displayed on output section 4 as a line figure. An example of edge detector 17 is shown in FIG. 8. First, bit map data which is a three-dimensional parameter is spatially differentiated in spatial differentiator 17A, and the result is subjected to a zero-crossing judgement by zero-crossing judging means 17B and the zero-crossing point is traced by edge tracer 17C, whereby the edge is obtained. By removing micro-projections and disconnected line segments from the obtained edge by the use of micro-projection remover 17D, an objective line figure can be obtained. Thus, a three-dimensional parameter value is spatially differentiated and the zero-crossing is extracted as the edge, which is the output line of the line drawing drawn by the user. With this, even if a line segment consists of intermittent short segments or of short line segments overwritten repeatedly, one smooth curve may be obtained.

In addition, an invisible portion of the drawing (such as the range over which the effect of the line segment extends if it is roughly inputted) can be obtained from the bit map data by processing the data in a threshold value processing unit and displaying the areas over the threshold value.

Since the edge detection can be accomplished by the mask operation of the bit map, it can be rapidly processed by special hardware. The bit map operator unit can be implemented, for instance, by n×m mask operations (for simplicity, n=2, m=2 may be used).

Algorithms familiar to those in the field of image processing may be used as the edge trace algorithm. For instance, standard algorithms for detecting the boundary between a light area and a dark area in image processing use techniques such as primary differential, secondary differential, zero-crossing judgment and edge trace. In this invention, the objective edge can be obtained by applying the secondary difference and the subsequent processings. (Reference: Computer Vision, written by Yoshiaki Shirai, Shokodo, p.24).

As is obvious from the foregoing, mountain 40 of a three-dimensional parameter reflecting the stroke input state is generated by appropriately selecting the characteristics of weighting function Vf. For instance, if the pen-stroke pressure P is small, by making certainty factor Cf and merge factor Mf small, and hence making the height of the mountain low and narrowing the width, the effect on other line segments can be reduced. In addition, if the input velocity of the pen is large, the effect on other line segments can be made large by making joint factor Jf large and widening the foot of the mountain in the extension direction of the line segment.

In this way, the user can set various characteristics for weighting function Vf. An example of changing the characteristics of weighting function is shown in FIG. 9. The most usual depiction of Vf is a triangular mountain as shown in (a) of the FIG. 9. (This is identical to that depicted in FIG. 7). If importance is attached to existing input data, then the effect of the certainty factor Cf is made small. That is, the vicinity of the top of the mountain is made to more gently change so as not to cut the top of an existing mountain in the vicinity of an input stroke as shown in (b). Conversely, if more importance is attached to new data and the intent is to have a function which simply removes the data reflected in the existing mountain, which makes the effect by certainty factor Cf large, the characteristics are made such that the mountain peak becomes sharp as shown in (c) or (d).

In the case of (d),
(when $1<=x2$)

$$Vf=Rf \times Cf(-1/x1)$$

(when $1>x2$)

$$Vf=Rf \times Cf(1-x2/x1) \times (Mf-x2)$$

Thus, by changing the characteristics of the weighting function, the shape of mountain 40 of a three-dimensional parameter for the stroke input state can freely be changed.

FIG. 10 shows an example of processing sketch-like graphic input. That is, FIG. 10 shows how a single curve can be automatically generating from an input operation consisting of repetitively drawing short line segments. In this case, the input is performed in the "ADD" mode.

Referring to FIG. 10(*a*), line segments SL1, SL2 and SL3 are input, in that order, in local area 200. It will be assumed that the repetition factor Rf of each line segment as a function of the number of repetitions is specified in Table 1. Referring to that table, it will be seen that the repetition factors Rf corresponding to the number of times of repetition N=0 and N=1 of line segments SL1 and SL2 are 1 and 3/2, respectively. The resulting weighting functions Vf1 and Vf2 of line segments SL1 and SL2 in the vicinity of point AN are shown in FIG. 10(*b*). (The remaining conditions are assumed to be the same). The weighting function Vf12 after merger and normalization is as shown in FIG. 10(*c*).

If the number of times of repetition N of line segment SL3 is 2, the repetition factor Rf of the corresponding line segment is 1. The relation between Vf12 obtained by merging line segments SL1 and SL2 and Vf3 corresponding to line segment SL3 is as shown by (d). By merging these to detect the edge, a new point is drawn. By applying such process to the whole area within local area 200, one continuous line segment S is obtained as shown in FIG. 10(*e*).

It should be noted that differences in the pen-stroke pressure or the positioning of a line segment at a location with less interference may cause a plurality of unintended peaks or line segments as a result of merging line segments SL1 and SL2. Such peaks or lines may be erased by selecting the "ERASE" mode. Alternatively, it may be possible to obtain one continuous line segment to be obtained by modifying the input method of the next line segment SL3 without changing from the "ADD" mode. For instance, if line segment SL3 is slowly drawn with a large pen-stroke pressure P and a small pen velocity V, the associated certainty factor Cf becomes large and the unwanted peaks of line segments SL1 and SL2 are cancelled. Thus, the desired line segment can be obtained.

FIG. 11 shows the processing for a case where correction is made by overwriting line segment SL2 on part of a previously written line segment SL1. First, after drawing line segment SL1 in the "ADD" mode, the "REPLACE" mode is specified by edit mode switching section (FIG. 3, mode switching section 31). As is illustrated, strong overwriting makes the certainty factor Cf of line segment SL2 great, and its mountain 40B has a sharp peak portion and a low foot portion, as shown in (*c*) or (*d*) of FIG. 9. Accordingly, if mountains 40A and 40B are added together and normalized in the bit map handling section, the vicinity of the intersection of line segments SL1 and SL2 becomes considerably lower, and a mountain having a fairly low foot portion (or having a groove position as the case may be) and a sharp peak portion is obtained. By performing edge detection for such mountain, the peak portion is detected, and as shown in (*d*) of the Figure, continuous line segments SL1'+SL2' and discontinuous line segment SL1" are obtained. When the "REPLACE" mode is specified, the disconnected and isolated line segment SL1" is automatically deleted and replaced by line segment SL2'. The microprojections H will also be removed.

The result, as shown in FIG. 11(*e*), is one continuous line segment S, in which part of line segment SL1 is replaced by line segment SL2 and the output as represented as a single stroke.

Alternatively, by modifying the characteristics of certainty factor Cf or repetition factor Rf, the above correction of the line segment can be made while still in the "ADD" mode, rather than changing to the "REPLACE" mode.

An example of automatically correcting the data of a line segment by detection of the input state is shown in FIG. 12. This example connects two line segments SL1 and SL2 of a single line, where the intended single line was disconnected at the middle because of very fast writing. (FIG. 12(*a*)). Since joint factor Jf becomes large if the pen velocity is large, the foot portions between mountains 40C and 40D of the two weighting functions corresponding to the two line segments SL1 and SL2 both widen and overlap with each other, as shown in FIG. 11(*b*). Consequently, if the ridge of the merged mountain 40 is traced by edge detection (FIG. 12(*c*)), one line segment S results (FIG. 12(*d*)).

It should be noted that if the user intended to draw the two line segments SL1 and SL2 as two discontinuous lines, he need only input the line segments at a slow speed.

Thus, the creation of weighting function Vf is performed to reflect the user's intention for drawing or the stroke input state. The methods for detecting the input state and obtaining the weighting function Vf are not limited to those described in the embodiment: other methods or combination of them may be used as long to convert user's intention as to his input drawing intention into a three-dimensional parameter.

In summary, in this invention, input stroke data is projected onto a parameter space by a weighting function, and spatially differentiated to detect the edge, which is deemed to be the curve inputted by the user. Although stroke data is vector data, by associating with the stroke data certain factors, the stroke data can be developed into bit map data. This simplifies processing input line segments which are overlapping or connecting. Similarly, even if several short line segments are coexisting, the strokes in the vicinity of a newly input stroke can be processed as one integrated stroke.

Further, in this invention, since the parameter space is normalized and displayed for each stroke input into the system, the user can interactively input line segments as he verifies the output drawing. Similarly, if short line segments are being connected, the result can be fed back on a real-time basis, and thus the user can input while comparing and confirming his drawing intention with the actual Figure.

We claim:

1. A method for receiving strokes handwritten on an input/output screen and displaying a line segment on said screen, said method comprising the steps of:

receiving a stroke input by writing by hand with a pen on a first area of an input/output screen;

associating with each point of said stroke a plurality of parameters by
        detecting the pen-stroke pressure P of said stroke
        detecting the pen velocity V of said stroke;
        detecting the number of times N previous strokes have been input in said local area;
        converting P, V and N to a plurality of parameters wherein the following parameters are calculated:
            certainty factor Cf as a parameter showing whether the user is writing a line segment, Cf being a function of at least P and V merge factor Mf as a parameter showing the strength with which the user writes a line segment, Mf being a function of at least P;

joint factor Jf as a parameter showing density of the user input, Jf being a function of at least V; and repetition factor Rf as a parameter showing whether the user has intention of repeatedly writing a line segment, Rf being a function of the number of previous strokes input into said local area;

weighting said plurality of parameters to generate a three-dimensional weighting function, said weighting function associated with said input stroke;

reading from a memory means a stored weighting function associated with a previously input stroke, said previous stroke input in a local area on said input/output screen, said local area being an area substantially close to said first area;

adding said weighting function associated with said input stroke and said stored weighting function, said result of said addition being a generated weighting function;

storing said generated weighting function in said memory means;

detecting the edge of said weighting function to extract a line segment; and displaying said line segment on said input/output screen.

2. A method as set forth in claim 1 which further comprises: said steps of receiving stroke data, associating a plurality of parameters with said data, generating a weighting function, adding said weighting function with a previously stored weighting function, storing the result of said addition, and detecting the edge of said result, is performed iteratively.

3. A method as set forth in claim 1, wherein:

Cf is calculated by a relation of $Cf=kc \times P/V$ where kc is a constant;

Mf is calculated by a relation of $Mf=km \times P$ where km is a constant;

Jf is calculated by a relation of $Jf=kj \times V$ where kj is a constant; and

Rf is calculated by a relation of $Rf=kr \times R(N)$ (kr is a constant).

4. A method as set forth in claim 1 in which:

the pen-stroke pressure P and pen velocity V at is detected at each input point AN of said input stroke; and said certainty factor Cf and merge factor Mf are calculated for said each input point AN as a function of said pen-stroke pressure P and pen velocity V at said input point;

joint factor Jf iS calculated upon completion of said stroke, Jf being associated with the initial and final ends of said input stroke as a function of said pen velocity V at all points AN of said input stroke;

repetition factor Rf is calculated by reading out the data corresponding to repetition factors for previously input strokes, said previously input stokes input in said same local area as said current stroke, Rf being calculated from said previous repetition factors by increasing the number of repetition factors by one; and a three-dimensional weighting function Vf is calculated as a function of said calculated Cf, Mf, Jf and Rf.

5. A method as in claim 4 wherein:

said three-dimensional weighting function Vf is converted to bit map data;

said bit map data is normalized and stored in said memory means;

said bit map data is converted to two-dimensional parameters by edge detection, thereby generating a line segment; and said line segment is displayed on said screen.

6. A handwriting input apparatus comprising:

an input/output means for receiving data from a plurality of strokes drawing by a user;

said input/output means including a detection means for extracting an input state of each of said plurality of strokes, said input states comprising a plurality of variable parameters;

a processing means including:

a weighting function generating means for generating a three-dimensional weighting function on the basis of said plurality of variable parameters associated with each of said plurality of strokes, said plurality of variable parameters comprising parameters based on the stroke pressure P, velocity V, and coordinate values of each of said strokes, and number of repetitions N associated with each of said strokes, that is the number of said plurality of strokes which are drawn in a same local area;

wherein, for performing the conversion from said input state amounts P, V and N to three-dimensional parameters, said detecting means includes:

a certainty detector for obtaining certainty factor Cf as a parameter showing whether the user is writing a line segment with certainty by a relation of $Cf=kc \times P/V$ (kc is a constant), a merge degree detector for obtaining merge factor Mf as a parameter showing the strength with which the user writes a line Segment by a relation of $Mf=km \times P$ (km is a constant), a joint degree detector for obtaining joint factor Jf as a parameter showing the density of the user input by a relation of $Jf=kj \times V$ (kj is a constant), and an input area detector and repetition degree detector for obtaining repetition factor Rf as a parameter showing whether the user has intention of repeatedly drawing line segments by a relation of $Rf=kr \times R(N)$ (kr is a constant), and in said weighting function generating means, said weighting function Vf is generated from said certainty factor Cf, joint factor Jf, merge factor Mf and repetition factor Rf;

a local area reading means for reading out said weighting function associated with each of said plurality of strokes input in a local area;

a bit map handling means for adding two or more of said weighting functions to generate a new weighting function;

a recording means to record said new weighting function in a memory means;

an edge detecting means for detecting the edge of said new weighting function, said edge associated with a line segment;

a display means to display said line segment.

7. A handwriting input apparatus as set forth in claim 6 in which said input states are detected for each point of said input stroke.

8. A handwriting input apparatus as set forth in claim 6 wherein Rf is determined from the number of times of repetition RP(N) that a coordinate point AN is associated with each of said plurality of strokes by converting RP(N) to Rf by means of a table.

* * * * *